(12) United States Patent
Appelboim

(10) Patent No.: US 11,952,137 B2
(45) Date of Patent: Apr. 9, 2024

(54) AIRCRAFT TOW SYSTEM

(71) Applicant: Doron Appelboim, Snoqualmie, WA (US)

(72) Inventor: Doron Appelboim, Snoqualmie, WA (US)

(*) Notice: Subject to any disclaimer, the term of this patent is extended or adjusted under 35 U.S.C. 154(b) by 0 days.

(21) Appl. No.: 17/985,496

(22) Filed: Nov. 11, 2022

(65) Prior Publication Data
US 2023/0150667 A1 May 18, 2023

Related U.S. Application Data

(60) Provisional application No. 63/303,430, filed on Jan. 26, 2022, provisional application No. 63/278,920, filed on Nov. 12, 2021.

(51) Int. Cl.
*B64D 3/00* (2006.01)
*B64C 39/02* (2023.01)

(52) U.S. Cl.
CPC .............. *B64D 3/00* (2013.01); *B64C 39/022* (2013.01); *B64C 39/024* (2013.01)

(58) Field of Classification Search
CPC .......... B64D 3/00; B64D 5/00; B64C 39/022; B64U 10/60
See application file for complete search history.

(56) References Cited

U.S. PATENT DOCUMENTS

| | | | | |
|---|---|---|---|---|
| 8,308,142 B1* | 11/2012 | Olson | ................ | B64D 3/00 244/137.1 |
| 8,366,037 B2* | 2/2013 | Morris | ................ | B64D 3/00 244/1 TD |
| 8,646,719 B2* | 2/2014 | Morris | ................ | B64C 19/00 244/1 TD |
| 9,038,941 B2* | 5/2015 | Morris | ................ | B64D 3/00 244/17.27 |
| 9,187,173 B2* | 11/2015 | Morris | ................ | B64C 27/02 |
| 11,307,598 B2* | 4/2022 | Aldarwish | ........... | B64C 39/024 |
| 2005/0067524 A1* | 3/2005 | Johansen | ............... | B64G 1/005 244/3 |
| 2012/0091259 A1* | 4/2012 | Morris | ................ | B64D 3/00 244/17.11 |
| 2013/0008998 A1* | 1/2013 | Morris | ................ | B64C 27/02 244/17.11 |
| 2014/0246538 A1* | 9/2014 | Morris | ................ | B64C 27/02 244/17.13 |
| 2016/0031564 A1 | 2/2016 | Yates | | |
| 2019/0315462 A1* | 10/2019 | Skladman | ............ | B64C 39/022 |
| 2020/0033892 A1* | 1/2020 | Aldarwish | ............ | B64D 47/08 |
| 2020/0047885 A1 | 2/2020 | Gallo | | |
| 2021/0309353 A1 | 10/2021 | Gil | | |

FOREIGN PATENT DOCUMENTS

WO WO-2019226917 A1 * 11/2019 ........... B64C 39/022

OTHER PUBLICATIONS

International Search Report and Written Opinion dated Apr. 12, 2023, in corresponding International Application No. PCT/US22/49801; 11 pages.

* cited by examiner

*Primary Examiner* — Philip J Bonzell
(74) *Attorney, Agent, or Firm* — Kowert, Hood, Munyon, Rankin & Goetzel, P.C.; Gareth M. Sampson

(57) ABSTRACT

Disclosed is an unmanned, autonomous, cargo transport system comprising at least one towed aircraft coupled to a tractor aircraft for inflight towing.

20 Claims, 14 Drawing Sheets

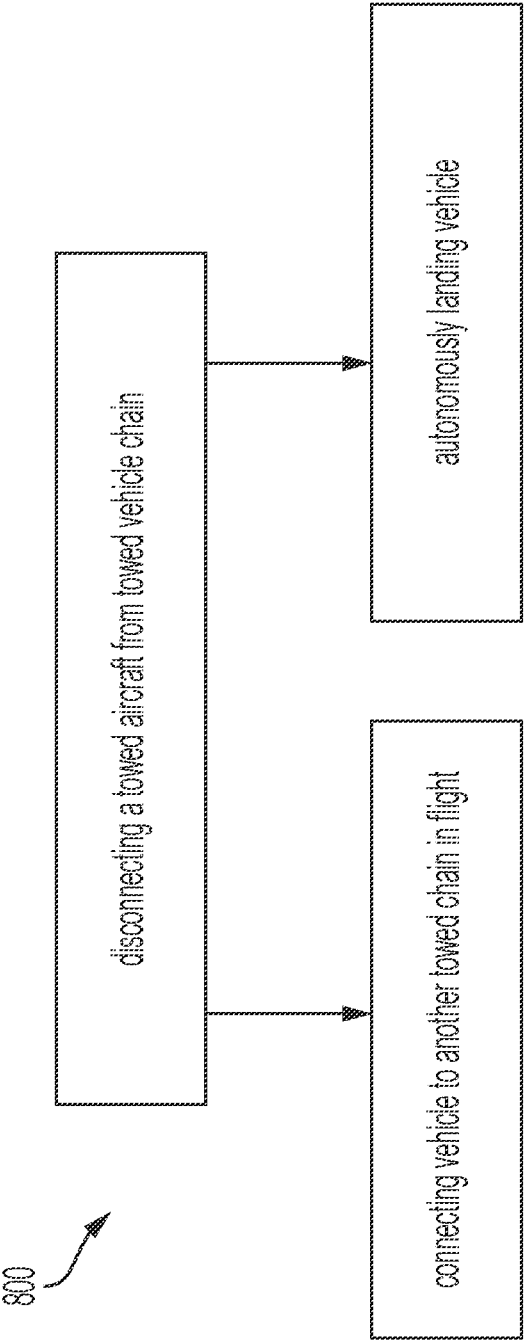

AIRCRAFT TOW SYSTEM

RELATED APPLICATION

This application claims benefit to U.S. Provisional Application No. 63/278,920 filed on Nov. 12, 2021, and U.S. Provisional Application No. 63/303,430 filed on Jan. 26, 2022, both of which are incorporated by reference herein in their entirety.

BACKGROUND

The present disclosure relates generally to systems and methods for efficient cargo transport, and more specifically to an aircraft cargo transport system.

There is an ongoing need for more efficient and improved systems of cargo transport, with reduced carbon emissions. While air transport of cargo may typically provide a faster and more direct transport route than land or water transport, weight constraints and fuel capacity of an aircraft may limit its efficiency. As such, there is a need for an improved aircraft cargo system which addresses at least the above-mentioned limitations.

SUMMARY

In certain embodiments, disclosed is a cargo transport system comprising one or more towed autonomous aircraft(s) coupled to a tractor aircraft. In embodiments, the towed aircraft may be used for transport of cargo. In some embodiments, the towed aircraft may be used to carry other supplies including fuel which may be used to power the tractor aircraft in flight. In some embodiments, the cargo transport system may include an autopilot control system for automated control of the towed aircraft(s). Additionally, the towed aircraft(s) may be coupled to the tractor aircraft, and/or to one another via at least one towing element comprising a cable, wherein the length of the cable may be changeable inflight to enable correct adjustment/readjustment of the towed aircraft(s) positioning. In further embodiments, the wheels of the towed aircraft(s) may be powered to help accelerate the towed air aircraft(s) during takeoff. In some further embodiments, a towed aircraft may switch its connection to another towed aircraft or towed aircraft chain in flight.

In some embodiments, disclosed is cargo transport system which may comprise: an engine powered tractor aircraft; at least one unmanned autonomous towed aircraft, which is connected to the tractor aircraft for inflight towing by the tractor aircraft; an autopilot system in the towed aircraft, wherein the autopilot system is configured to autonomously control taxing, takeoff, flight, and landing of the towed aircraft; a sensor system configured to sense flight parameters including relative locations of the tractor aircraft and/or of the towed aircraft and to communicate the sensed flight parameters to the autopilot system; and at least one towing element comprising at least one cable coupled between the towed aircraft and the tractor aircraft. In some embodiments, the length of the cable is adjustable. In certain embodiments, the cable length may be adjusted based on parameters such as flight state, environmental conditions, tractor and/or the towed aircraft(s) weight, cable tension (as detected by the cable tension sensors), etc., to optimize flight performance and/or minimize the fuel per cargo ratio. For example, the length of the cable may be shortened for taxiing, lengthened for landing, and varied inflight. In further embodiments, the towing element may include a sensor configured to measure magnitude and/or direction of tension in the cable. In yet further embodiments, the autopilot system may be configured to adjust the speed of the tractor aircraft to improve flight performance. In certain embodiments, adjustment of the speed of the tractor aircraft may be based on the measured tension vector in the cable. In some embodiments, the autopilot system may be configured to control the speed of the towed aircraft to lower the tension in the cable.

In certain embodiments, the autopilot system may be configured to adjust a position of the towed aircraft with respect to the tractor aircraft for positive wake energy gain from a turbulence vortex produced by the tractor aircraft and/or for reduction of drag. In further embodiments, the autopilot system may be configured to control steering, and inflight maneuvering of the towed aircraft. In some embodiments, inflight maneuvering via autopilot control of the towed aircraft may be based on inflight parameters of the tractor aircraft. In some further embodiments, the towed aircraft may carry cargo, an energy storage element, and/or emergency supplies. In certain embodiments, the energy storage element comprises fuel, hydrogen, and/or a battery. In further embodiments, the towed aircraft may be configured to power the tractor aircraft in flight. In some embodiments, the towed aircraft is configured to disconnect from the tractor aircraft inflight. In some embodiments, the towed aircraft is further configured to land autonomously separated from the tractor aircraft. Additionally, the towed system may comprise a two or more towed aircrafts, wherein a first towed aircraft may be coupled to the tractor aircraft and the second towed aircraft may be coupled to the first towed aircraft or to the tractor aircraft directly (such that the first and second towed aircrafts are attached in a parallel configuration to the tractor aircraft). In some embodiments, the first and/or second towed aircraft may be configured to fly, land, and taxi while coupled to the tractor aircraft; or to disconnect from the tractor aircraft inflight. In further embodiments, the first and/or second towed aircraft may be configured to navigate and land autonomously separated from the tractor aircraft. In yet further embodiments, the towed aircraft(s) include landing gear wheels driven by an engine or motor within the towed aircraft(s), the landing gear wheels configured to taxi and to accelerate with the tractor aircraft during takeoff. Additionally, the system may comprise one or more ram air turbine, and a battery, within the towed aircraft for generating electric power for inflight use.

In certain embodiments, disclosed is a takeoff method for a towed air aircraft chain, the towed air aircraft chain including one or more towed aircrafts coupled to a primary tractor aircraft via at least one towing element, wherein the takeoff method may comprise powering landing gear wheels of the towed aircraft to accelerate the towed aircraft along with the tractor aircraft during takeoff, wherein the landing gear wheels of the towed aircraft are driven by an engine or motor within the towed aircraft.

In certain embodiments, disclosed is an in-flight switch method for a towed aircraft chain, wherein the method may comprise disconnecting a first towed aircraft from a first tractor aircraft, and connecting the first towed aircraft to a second tractor aircraft, wherein disconnecting and connecting of the first towed aircraft are performed in flight. In some embodiments, the first tractor aircraft includes at least one second towed aircraft connected to the first tractor aircraft, wherein the first towed aircraft is coupled to either the first tractor aircraft or to the second towed aircraft prior to disconnecting the first towed aircraft from the first tractor aircraft. In further embodiments, the second tractor aircraft includes at least one second towed aircraft coupled to the second tractor aircraft, wherein the first towed aircraft is coupled to either the second tractor aircraft or to the second towed aircraft after connecting the first towed aircraft to the second tractor aircraft.

BRIEF DESCRIPTION OF THE FIGURES

The detailed description of some embodiments of the invention will be made below with reference to the accompanying figures, wherein the figures disclose one or more embodiments of the present invention.

FIG. 2A depicts an engine to wing towing connection.

FIG. 2B depicts a tail to wing towing connection.

FIG. 2C depicts a tail to wing towing connection.

FIG. 2D depicts a tail to nose towing connection.

FIG. 2E depicts a connection for a chain of multiple tractor aircraft, wherein each aircraft is connected via its own cable to the tractor aircraft.

FIG. 7 depicts a takeoff system for the towed aircraft system, according to various embodiments.

FIG. 8A is a flow chart for an inflight switch system, according to certain embodiments.

DETAILED DESCRIPTION OF CERTAIN EMBODIMENTS

Aircraft may have a limited takeoff weight due to structural weak points. Such structural weak points may be present, for example, in the landing gear and/or wing connection of the aircraft. Additionally, the fuel capacity of an aircraft limits flight distance and/or adds to the transport time as the aircraft is required to stop and refuel for longer flights. These factors reduce the overall efficiency and cost of cargo transport.

The disclosed subject matter provides a towed aircraft system 10 that includes one or more aircraft towed by an engine powered tractor aircraft for carrying cargo, supplies, fuel, and/or other material. This enables a larger amount of cargo to be transported and reduces the cost per shipment in comparison to conventional air transport. Additionally, while many aircrafts may have sufficient thrust available for pulling heavier loads, they may be limited in the amount of weight they can carry due to structural weakness in their landing gear and/or wing connection structure, and/or in the cargo volume capacity. The disclosed system circumvents these limitations by placing the added load/volume in the towed aircraft instead of the tractor aircraft. This enables the tractor aircraft to utilize the additional available thrust to pull cargo in the towed units and avoids overloading the tractor aircraft.

Additionally, according to various embodiments, each towed cargo aircraft may generate its own lift and omit non-cargo heavy components, such as an engine, fuel, pilot, human support equipment, etc. As such, energy spent by the tractor aircraft to pull load in the towed aircraft(s) may be much smaller than if that same load would be carried by individual engine-powered planes, since the relative demand on the tractor plane's engine may be reduced compared to the sum of the increased cargo carrying capacity. Consequently, the towed system is significantly more efficient and cost-effective than conventional aircraft cargo transport that uses only engine powered planes.

Figure 1:
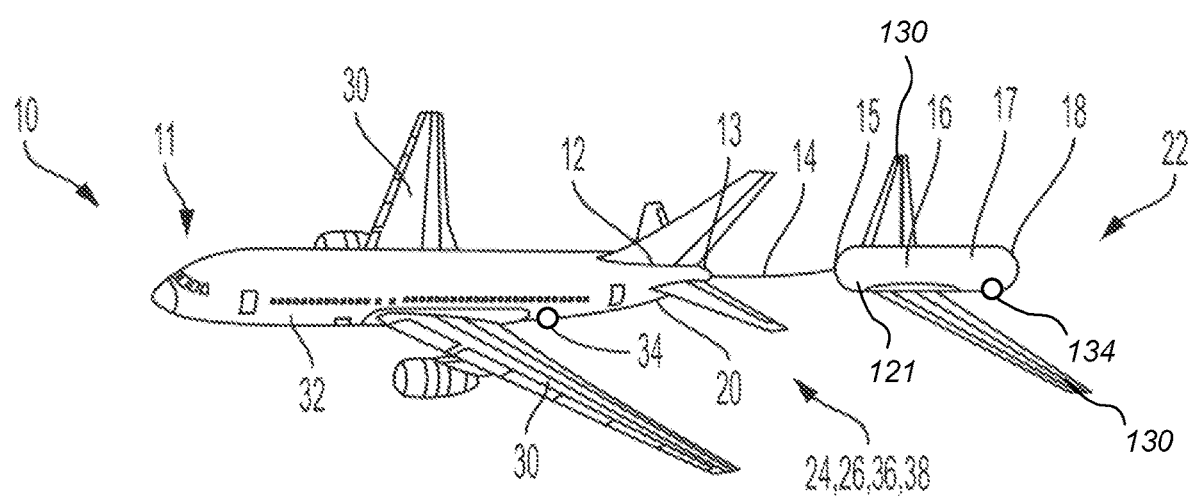
FIG. 1 is a schematic depiction of a towed aircraft system comprising a tractor aircraft coupled to a towed aircraft, according to certain embodiments.
Figure 2A:
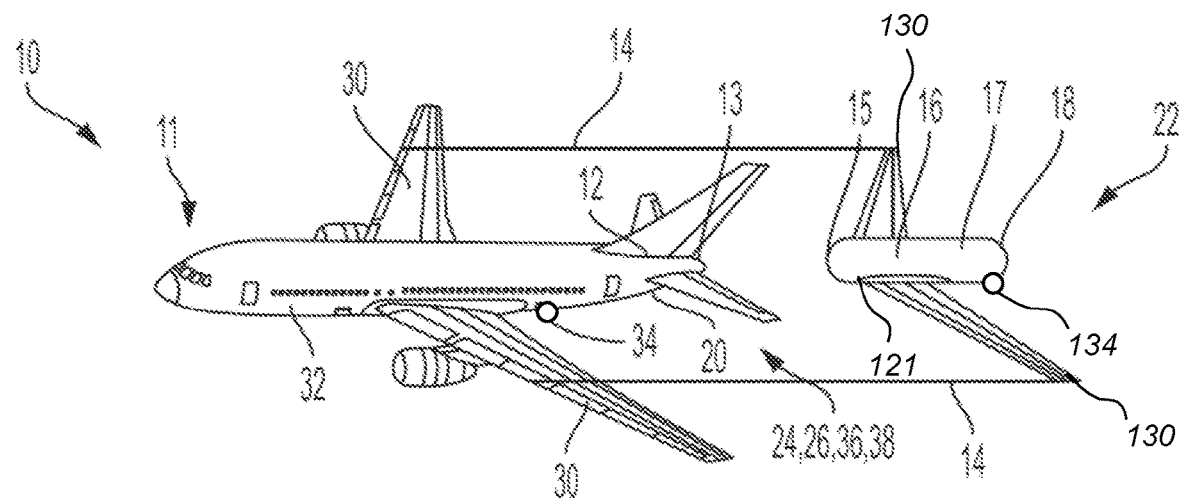
FIGS. 2A-E provide schematic depictions of various configurations for connection of the tractor aircraft to the towed aircraft using a towing element.
Figure 2B:
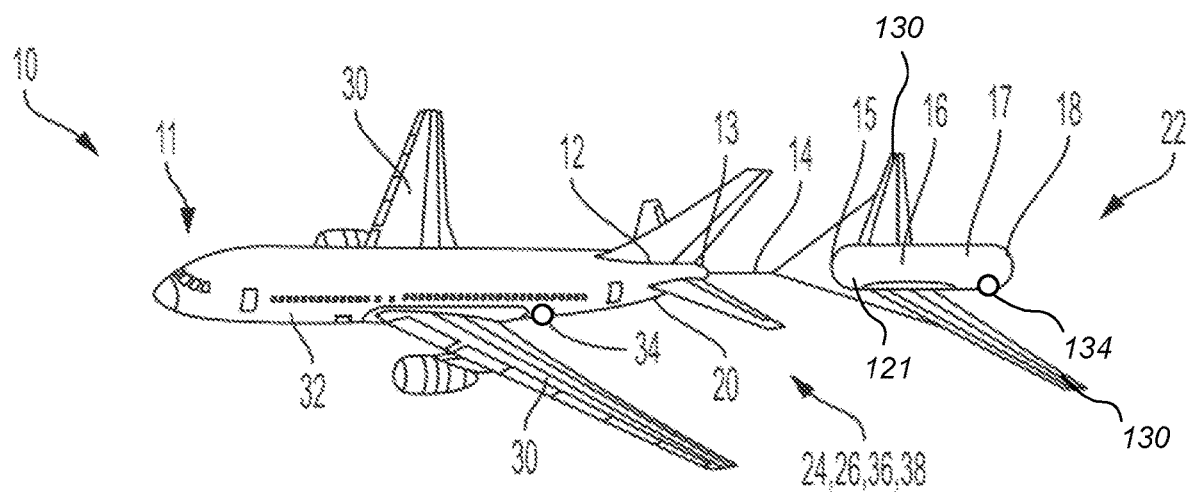
Figure 2C:
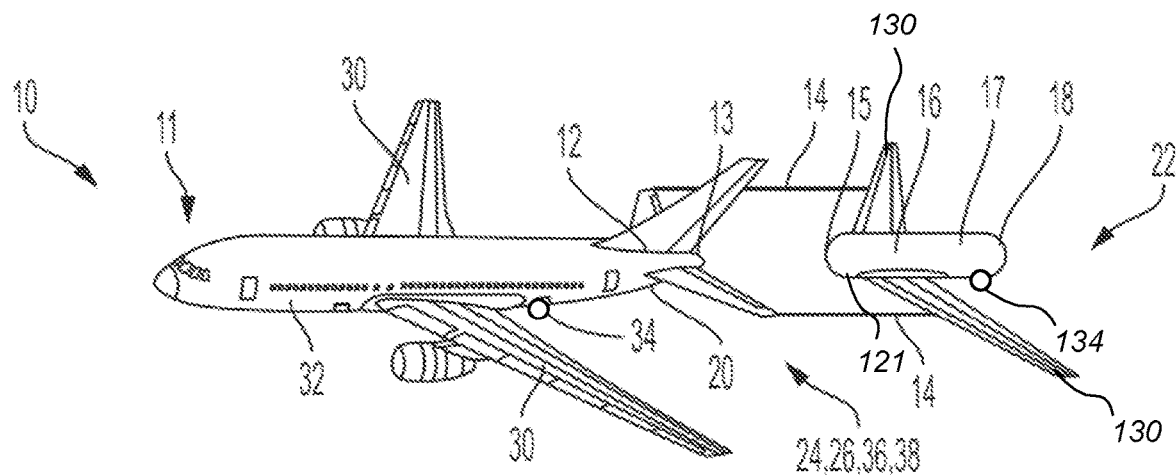
Figure 2D:
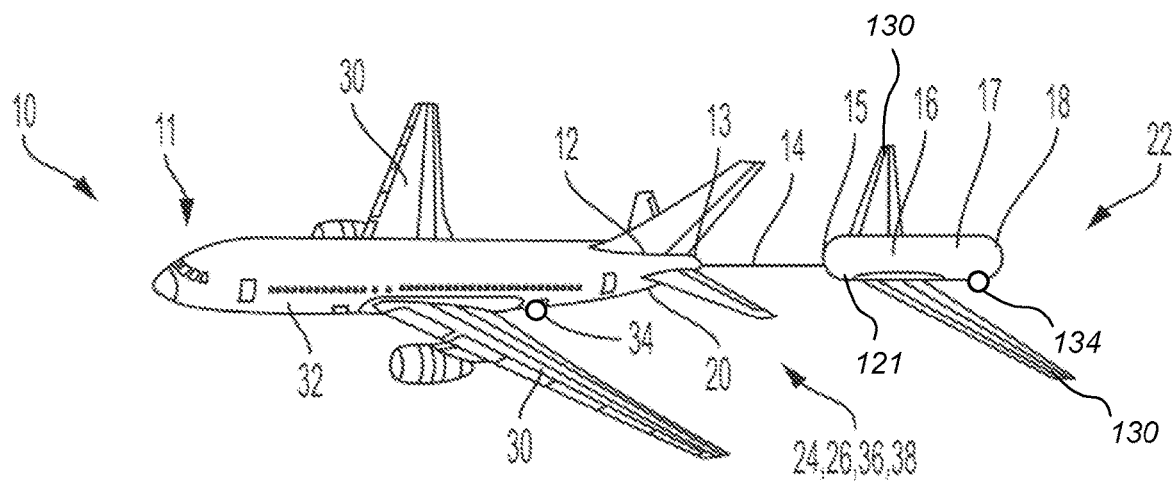
Figure 2E:
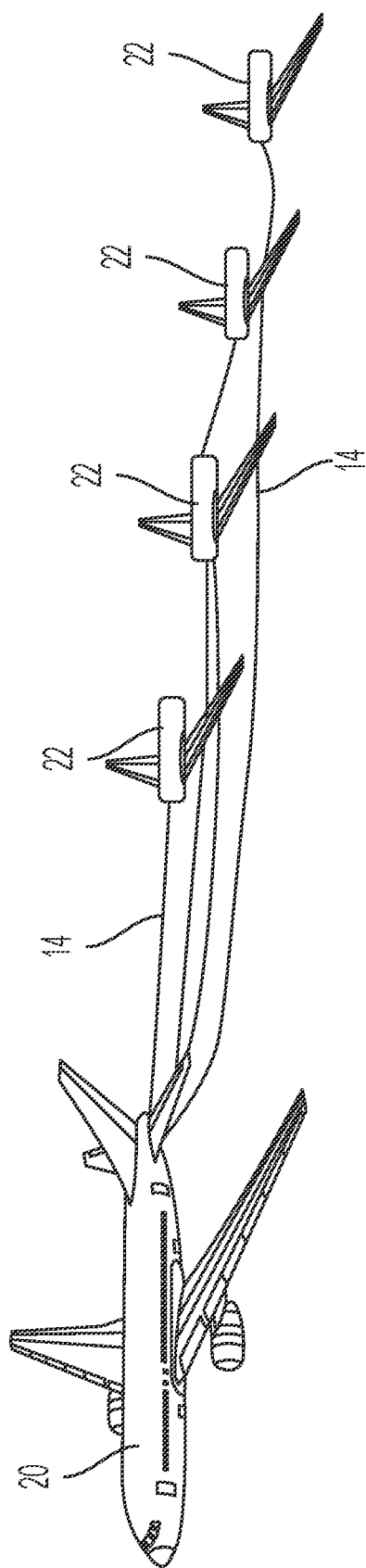
Figure 3:
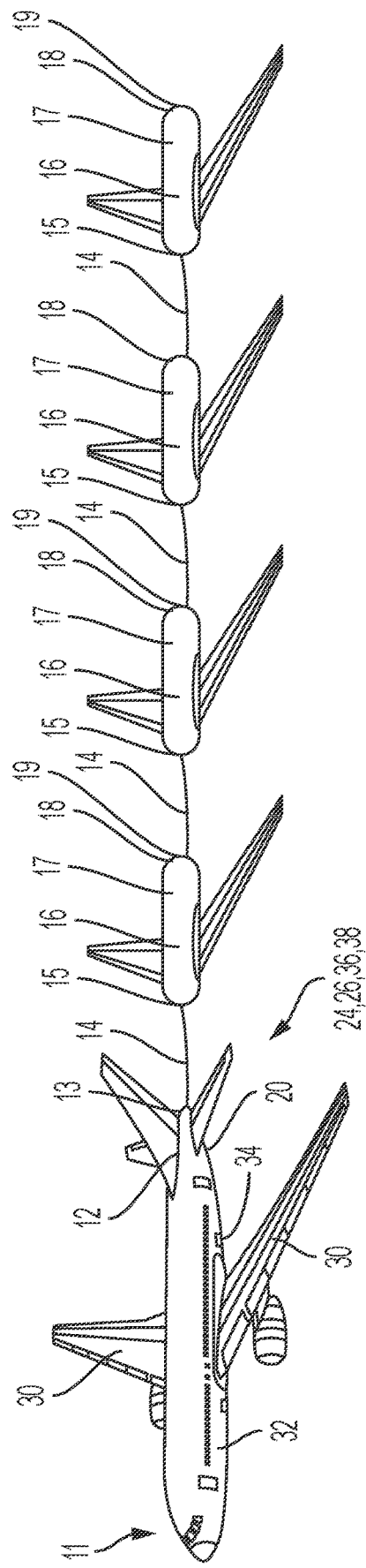
FIG. 3 is a schematic depiction of a chain of towed cargo aircraft, according to certain embodiments.

In certain embodiments as depicted in FIGS. 1-3, the disclosed system may comprise one or more winged towed aircraft(s) 22, which may each carry cargo, and are towed via a primary tractor aircraft 20. In some embodiments as best depicted in FIGS. 2A-E, the disclosed system may use one or more towing elements 14, which may include cable(s) to connect towed air aircraft(s) 22 to tractor aircraft 20 or to connect successive towed aircraft to one another. As depicted in FIG. 3, multiple towed aircraft 22 may be connected in series to form a chain. In alternate embodiments, multiple towed air aircraft 22 may be connected in parallel to the tractor aircraft. In further embodiments, multiple chains may be coupled in parallel and in series; that is, multiple aircraft chains may be coupled in parallel to the tractor aircraft 20. For example, a first tractor aircraft 20 or a first chain of multiple towed aircrafts 22 may be coupled to the left side of tractor aircraft 20, and a second tractor aircraft 20 or a second chain of multiple towed aircrafts 22 may be coupled to the right side of tractor aircraft 20.

The tractor aircraft 20 may be, for example, a piloted engine powered aircraft, having fuselage 32 with wings 30 and landing gear system 34, such as a commercial/passenger aircraft, and/or a cargo dedicated aircraft, but is not limited to these options. In alternate embodiments, tractor aircraft 20 may be unmanned. In certain embodiments, tractor aircraft 20 may be configured to monitor and/or receive status information regarding the towed aircraft(s) (e.g., flight status, health status, alerts, etc.). The system may further comprise various sensors, communication, and control components to enable monitoring and/or autopilot control of the towed aircraft system 10.

In embodiments, towed aircraft(s) 22 may generally comprise a fuselage structure 16 having wings 130, supporting a cargo bay 121 and other avionic and non-avionic systems and components. In one embodiment, towed aircraft(s) 22 may omit non-cargo heavy components, such as the engine, fuel, pilot, human support equipment, etc. In further embodiments, towed aircraft(s) may utilize lift generated from the tractor and/or towed aircraft(s) themselves.

In certain embodiments, the towed aircraft(s) 22 may include a landing gear system 134. In one embodiment, landing gear system 134 may comprise retractable wheels. In further embodiments, landing gear system 134 may comprise landing gear engines configured accelerate the wheels for functions such as landing, taxiing, and takeoff. In some embodiments, towed aircraft(s) 22 may further include a steering and/or brake system 36. In certain embodiments, towed aircraft(s) 22 may include nose-wheel steering and/or wheel driving capability. In one embodiment, landing gear system 134 may switch between various positions, including extending the wheels for landing and braking, retracting the wheels, and/or a specific position that will enable stable acceleration of the towed aircraft by the wheel's engines, without lifting of the nose wheel during acceleration. In further embodiments, towed aircraft(s) 22 may also include non-avionic systems 38 that may comprise an air-conditioning and pressurization system, a non-avionics electrical system, a non-avionics hydraulic system, and/or other cargo specific system(s) or components.

Figure 4:
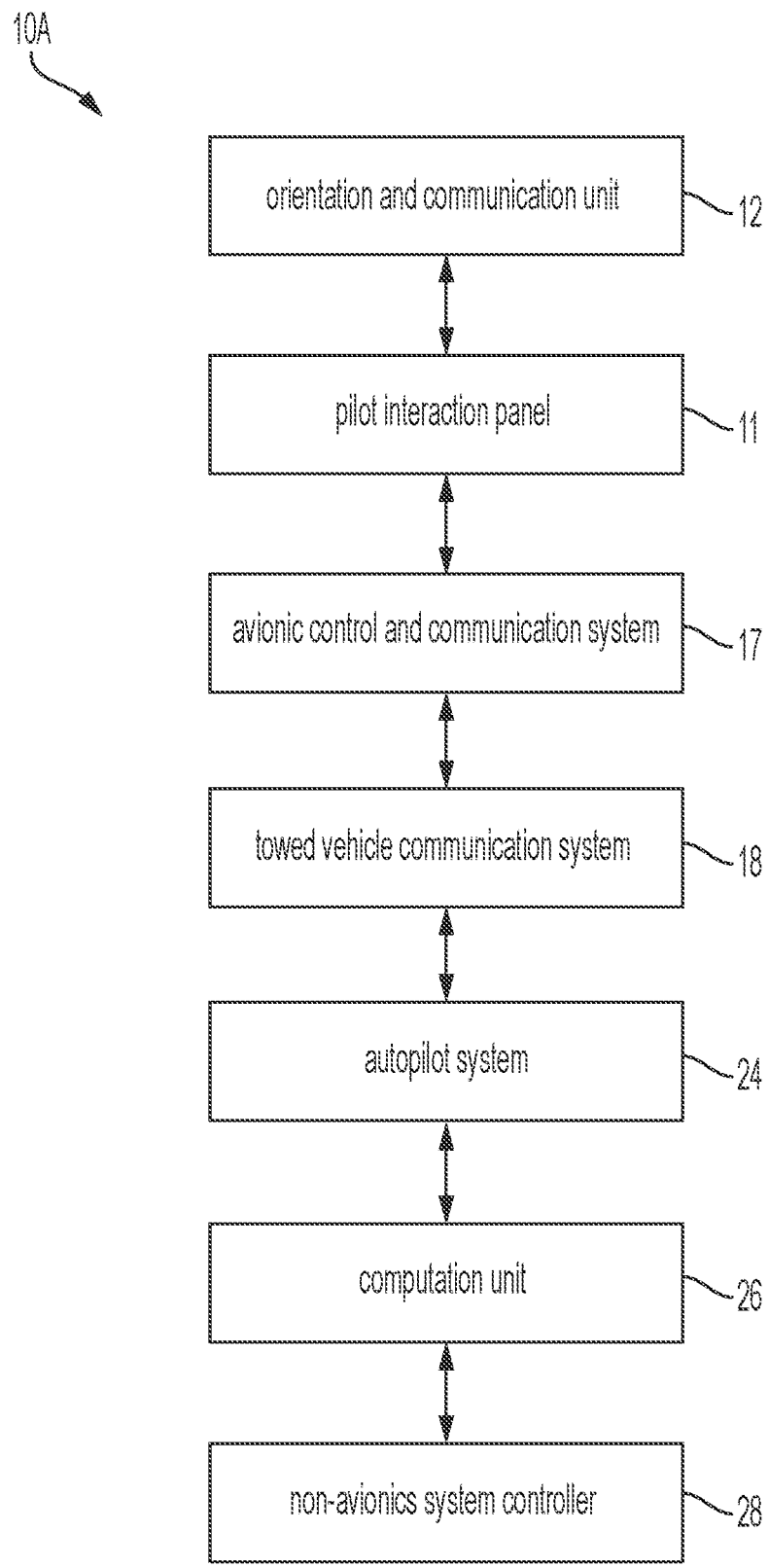
FIG. 4 is a flow diagram for a communication and control system for the towed aircraft system.

In some embodiments and with specific reference to FIG. 4, towed aircraft system 10 may comprise a communication and control system 10A. Communication and control system 10A may include an orientation and communication unit 12 via which tractor aircraft 20 may be in communication with the towed aircraft(s) 22. In some embodiments, orientation and communication unit 12 may include flight sensors configured to sense the orientation and/or other flight parameters (wind speed, aircraft speed, health status, etc.) of tractor aircraft 20 and transmit the information to a computation unit 26 of the towed aircraft(s) 22 and/or tractor aircraft 20 for processing and control of towed aircraft system 10. In some embodiments, orientation and communication unit 12 may be configured to transfer information and commands between a pilot interaction panel 11 of the tractor aircraft and a communication system 18 of the towed aircraft(s). In certain embodiments, orientation and communication unit 12 may be configured to process and relay information from the towed aircraft(s) 22 to the pilot interaction panel 11 that enables a pilot of tractor aircraft 20 to monitor and/or control towed aircraft(s) 22. In further embodiments orientation and communication unit 12 may be configured to integrate with an autopilot system 24 within towed aircraft(s) 22 and/or tractor aircraft 20. In certain embodiments, communication and/or control system 10A may comprise an avionic control and communication system 17 configured to control avionic components of towed aircraft(s) 22. Avionic control and communication system 17 may include a flight computation system, a flight control and actuation system, an aircraft control system, a data logging system, and/or a navigation and orientation system. In some embodiments, avionic control and communication system 17 may be configured to relay information to pilot interaction panel 11 and/or integrate with autopilot system 24. In one embodiment, information from the flight sensors of the orientation and communication unit 12 may be relayed to the computation and actuation systems of avionic communication and control system 17 for control of various avionic components of the tractor aircraft and/or towed aircraft. In some further embodiments, the orientation and communication unit 12 may be connected to a non-avionics system controller 28 to react, command actions, and/or transmit reports from that system.

In certain embodiments, the towed aircraft may have the ability to track the position and orientation of the tractor airplane by use of optical sensors and computerized vision algorithms, and/or a tracking system based on electromagnetic frequency that can sense the tractor airplane position and orientation. In one embodiment, the autopilot system may use a computer vision sensor and/or algorithm to monitor the tractor aircraft from the towed aircraft (or visa verse) in visual optical spectrum and/or infra-red spectrum. This may provide the autopilot system with information regarding the relative positions of the towed aircraft and tractor aircraft. The computer vision sensor and algorithm may use a mono dimension camera array or stereo or triple camera array to calculate the relative positions with improved accuracy and redundancy.

Figure 9A:
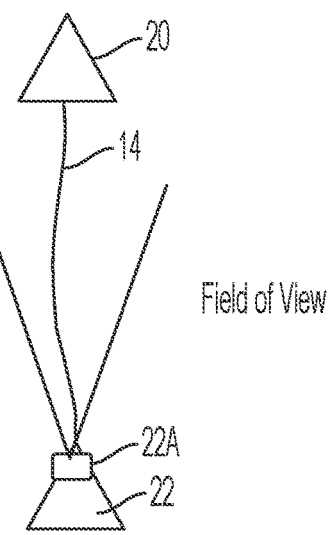
FIG. 9A is a schematic depiction of a camera mounted on a towed aircraft.
Figure 9B:
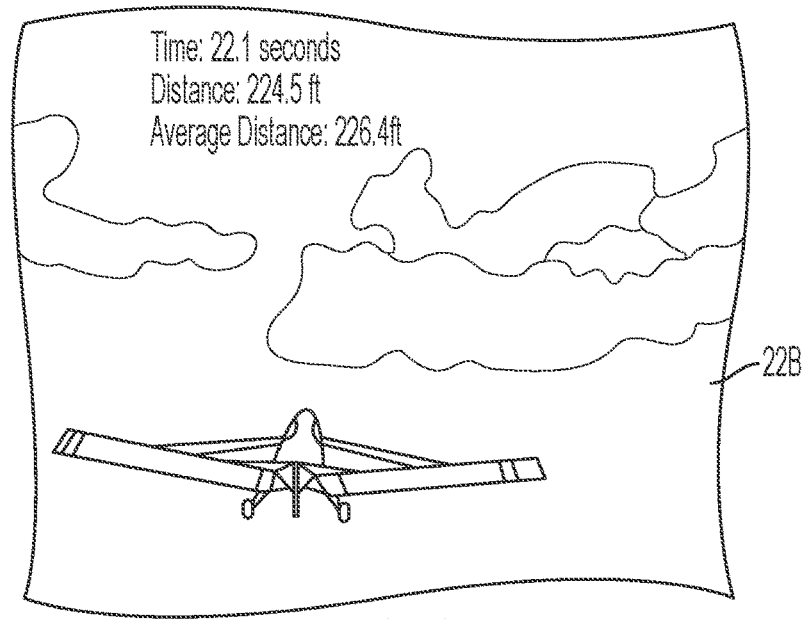
FIG. 9B is an example of a video image obtained by the camera.
Figure 9C:
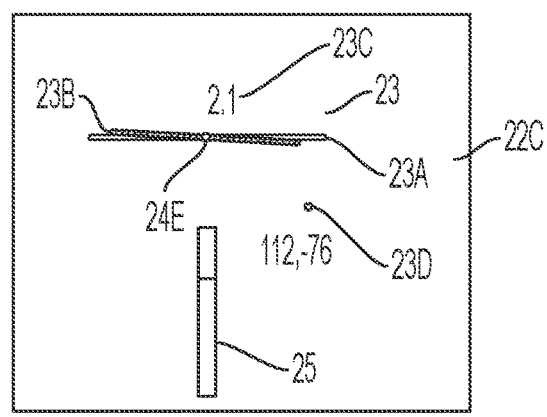
FIG. 9C is an example of a pictorial representation of information obtained by the camera.

In one embodiment, a stationary or gimbaled camera 22A may be provided on one of the aircraft while the other aircraft image and/or infrared print is tracked or videoed (see FIGS. 9A and B). This may be used to provide information such as relative positions, including the other aircraft's left and right deviation, up and down deviation, roll, yaw and pitch, and/or the distance. In some embodiments, camera 22A may be provided at the front end of one or more towed aircraft(s) 22, or on each towed aircraft 22 for a system of multiple towed aircraft. The information obtained may be processed by the algorithm and provided in a visual display 22B and/or a pictorial representation 22C (see FIGS. 9B and C) which may be relayed to the pilot interaction panel 11 and/or autopilot system to enable the pilot and/or autopilot system to react and control the towed aircraft(s) 22 for maintaining an appropriate position behind the tractor aircraft(s). According to an exemplary embodiment, pictorial representation 22C as shown in FIG. 9C may include a pictorial representation 23 of the relative wing roll angle. For example, a first horizontal line line 23A may represent the towed aircraft's wing angle (which will be horizontal where the camera is coupled to the wing's nose), and a second horizontal line 23B may represent the tractor or leading aircraft's wing angle. During travel, second horizontal line 23B may rotate clockwise or counterclockwise as the wing angles are adjusted. In further embodiments, pictorial representation 23 may be accompanied by a numeric reading 23C of the roll data. In further embodiments, pictorial representation 22C may also provide an indication 23D of lateral and elevation positions relative to an ideal position. As shown in the figures, this may be represented by a circle indicating the lateral and vertical offset of the tractor aircraft relative to the ideal location, wherein the ideal location may be represented by a central circle 24E in pictorial representation 23. In further embodiments, pictorial representation 22C may further include a graphic representation 25 of the range and/or cable tension between the two aircraft. This may comprise, for example, a bar with a horizontal line indicating the distance between the aircraft. In some embodiments, the bar may display a color change indicating slack or excess tension in the cable. Pictorial representation 22C may be accompanied by various numeric readings as well, including distance, set point data, etc., as shown in the figure. It shall be appreciated that various representations of information obtained by camera 22A may be used in alternate embodiments.

In certain embodiments, computer vision may be used to detect the leading aircraft, wherein information regarding relative attitude and relative position may be extracted using object tracking algorithms such as CSRT. For example, the wingtip of the leading aircraft may be tracked simultaneously to create a segment, wherein the relative bank angle, phi, may be represented by the following:

phi=a tan 2((tip[Right].y−tip[Left].y), (tip[Right].x−tip[Left].x), where: tip tip[Right].y, tip[Left].y, tip[Right].x, tip[Left].x, are the coordinates, in pixels, of each wingtip.

Since the wingspan of the leading plane and the field of view (fov) angles of the camera are known, the relative position of the leading plane may be calculated as follows:
Distance Calculation (z coordinate)
1x=Wingspan*cos(phi)
1y=Wingspan*sin(phi)
dx_theta=fov_x*nx/frame.shape[1]
dy_theta=fov_y*ny/frame.shape[0]
d_theta=sqrt(dx_theta*dx_theta+dy_theta*dy_theta)
dist=1/d_theta, where:
Wingspan=Leading plane wingspan in meters
nx,ny=distance in pixels on each axis between wingtips
Frame.shape[1]=video frame width in pixels (e.g., 1920)
Frame.shape[0]=video frame height in pixels (e.g., 1080)
Fox_x, fov_y=camera FOV angles in radians
Relative Displacement Calculation (x,y coordinates)
The following formula may be used to calculate the relative dx and dy coordinates:
frame width_x=2*distance*tan(fov_x/2)
frame width_y=2*distance*tan(fov_y/2)
dx=frame width_x*dpx_x/frame.shape[1]
dy=frame width_y*dpx_y/frame.shape[0]
Where:
distance=the distance of the leading plane as calculated above; and frame.shape[i] is as defined above.

It shall be appreciated that in alternate embodiments, additional points such as the tail tip and nose, may also be tracked to detect relative pitch and yaw angles and/or for improved accuracy. It shall be appreciated that in alternate embodiments, more than one camera may be used, in which case stereo vision may be used to calculate distance. It shall be appreciated that while wingtip acquisition for the tracker may be performed manually by the user, object detection algorithms (such as Faster R-CNN, YOLO, or SSD) may be used in order to automatically detect the leading plane and acquire the wingtips, or other parts, for tracking. Additionally, pre-trained filters and/or flight recording data may also be used to train a custom filter for detecting the aircraft. In some embodiments, different output signals (other than tracking wingtips or specific parts) may be used to calculate the relative attitude and position of the leading plane depending on filter performance and output.

In certain embodiments, autopilot system 24 may provide an algorithm which determines optimal flying speeds for both the tractor and the towed aircraft, in real time. The optimal flying speeds may be determined for improved fuel consumption based on all aircraft in the towed system, and may be used to adjust speed of the tractor aircraft in flight. In embodiments, optimal flying speeds may be determined based on factors such as the measured tension in the cable, the flight state, environmental conditions, and weights of the tractor and towed aircraft(s).

In some embodiments, the disclosed system may provide an autopilot algorithm and control laws for aligning the towed aircraft with the cable's tension direction. This may utilize Ailerons, Rudders, Elevator, and air braking surfaces to move the towed aircraft according to the cable's tension and direction and/or according to the wake and drag holes behind the tractor.

In certain embodiments, landing gear system 34/134, steering, brake system 36, and/or non-avionic systems 38 may be configured to relay information to pilot interaction panel 11 and/or to enable control via commands from autopilot system 24 or non-avionics system controller 28 to maintain the required track on the runway, the required braking level and to maintain the required towline tension. In some embodiments, autopilot system 24 may enable towed aircraft(s) 22 to autonomously perform functions such as taxing (while towed and/or separated from the tractor unit), maintaining a central position on the runway during takeoff and landing, and adjusting aircraft speed (using brakes) to automatically maintain an appropriate position behind the tractor airplane and/or tension in the towing device, etc.

In embodiments, the towed aircraft(s) 22 may be coupled to primary tractor aircraft 20 or to another towed aircraft via a towing element 14 that comprises at least one cable for pulling of the towed aircraft(s). As such, tractor aircraft 20 and one or more towed aircraft 22, are coupled via one or more towing element(s) 14 ("cable(s) 14") to form a towed air aircraft chain. In embodiments, cable 14 may be configured to enable the flow of energy as liquid fuel or electricity from the towed aircraft to the tractor aircraft, and/or transfer of data (e.g., over communication electronic wires or fiber optics). In further embodiments, the cable may include a heating element to prevent accumulation of ice during flight when needed, and/or may include a covering to protect the cable from physical damage.

In some embodiments, the cable(s) of towing element 14 may be rigid or semi-rigid. In some embodiments, the cable(s) may have varying degrees of rigidity throughout the cable length. The towing element 14 may be coupled between various components of the tractor and/or towed aircraft, including components of the wings, and tail assembly. FIG. 2A-D provides various non-limiting examples for connection of one or two towing elements between the tractor aircraft and towed unit. It shall be appreciated that various other configurations, and any number of towing elements may be used in alternate embodiments.

In certain embodiments, towing element 14 may also include a data communication line which may transfer information from the towed aircraft to the tractor aircraft and vice versa (e.g., via orientation and communication unit 12 and/or tow connection elements described below). In other embodiments, data communication may also be wireless between the tractor 20 and the towed aircraft(s) 22.

In some embodiments, the cable of towing element 14 may be configured to extend and/or retract enabling control of the range/distance of the towing aircraft behind the lead aircraft. In embodiments, a smart towing element 14 may be configured to adjust the positioning/distance of the towed aircraft(s) 22 throughout the duration of the flight, and based on factors such as flight speed and flight segment (taxi, takeoff, cruise, descent, and landing), turbulence, wake turbulence, cable tension, etc. Extending/retracting the cable (s) of towing element 14 may further enable control of the rigidity of the tow cable(s). For example, a cable having segments of varying rigidity may enable selection of a specific rigidity by retracting the cable length so that the segment with the desired rigidity is exposed. This may enable different flight dynamics for different portions of the flight. For example, a first rigidity may be used in flight, while a second rigidity may be used for taxing, and/or the degree of rigidity may be altered throughout the flight. In some embodiments, retraction of the tow cable may be used for reverse taxiing.

In certain embodiments, the towing element 14 may include orientation and/or force sensors, which may comprise at least one cable tension and direction sensor. The cable tension and direction sensor may detect forces and their direction on the cable(s) and/or on different portions of the cable(s), including torque, tension, sheer, etc.

In certain embodiments, the cable length may be configured to adjust to correct and/or optimize positioning and flight performance for fuel conservation, and for control of the towed aircraft based on the cable tension, and further on parameters such as flight state, environmental conditions, tractor and/or the towed aircraft(s) weight, etc. For example, in landing, towing element 14 may be configured to reduce tension in the cable (e.g., via orientation and communication unit 12 and/or autopilot system 24) by causing tractor aircraft 20 to brake in sync or with less strength than the tractor aircraft 20 while taxiing, or by reducing the speed of the tractor aircraft 20 in flight. As another example, during turning of the tractor aircraft, the cable sensors may be configured to sense that the cable is pulling at an angle and provide information to correct positioning accordingly. In certain embodiments, sensors may be used to detect and avoid various objects/obstacles when taxiing.

In embodiments, the above-described sensors may feed orientation information to the pilot interaction panel 11 (via orientation and communication unit 12) and/or to the autopilot control system 24. In certain embodiments, a pilot and/or the autopilot-controlled system may utilize the orientation information together with preloaded runway parameters and real-time coordinates, to perform such functions as preparing for landing, braking, etc.

In certain embodiments, towing element 14 may include a fuel transfer element, for enabling the flow/transference of an electric or other type of fuel forward or backward over the tow to supply the tractor and/or any towed aircraft in a chain of multiple tow aircrafts. In some embodiments, the towing element cable may also function as the fuel transfer element.

In certain embodiments, a connection element 13 between a front part of towing element 14 and a back part of the primary tractor craft 20 may be configured to support the pull of the tractor system. In embodiments, connection element 13 may further be a junction point to enable electric power transfer, and/or information transfer between the primary tractor aircraft and the towed aircraft(s). This may include reporting health status of the towed aircraft and other cargo related information. In some further embodiments, connection element 13 may be configured to activate commands from the towed aircraft avionics control and communication system 17, for example to extend or retract a cable of towing element 14 permitting control of the range of the towed aircraft(s).

A connection element 15 may further connect a back part of towing element 14 to a front part of towed aircraft 22. In embodiments with multiple towed aircrafts as shown in FIG. 3, a connection element 19 may connect a front part of towing element 14 to a back part of a leading towed aircraft 22, wherein connection element 15 connects the back part of towing element 14 to a front part of a successive towed aircraft 22 which is towed by the leading towed aircraft. In embodiments, connections elements 15 and/or 19 may serve as junction points for transfer of data, power, and/or other cargo related information between successive towed aircraft(s) and/or the tractor aircraft (via orientation and communication unit 12). In some further embodiments, connection elements 15 and/or 19 may be configured to activate commands from the towed aircraft avionics control and communication system 17, for example to extend or retract the towing element permitting control of the range of the towed aircraft(s).

In embodiments, connection elements 13, 15, 19 and towing element 14 may be configured to enable communication/data transfer and/or power transfer between successive aircraft. For example, information regarding the health and/or state of the towed aircraft may be conveyed from the communication and/or control system 17 (via the flight computation system) to the tractor towing connection 13 though towing element 14.

Cable Connection Assembly

Figure 10:
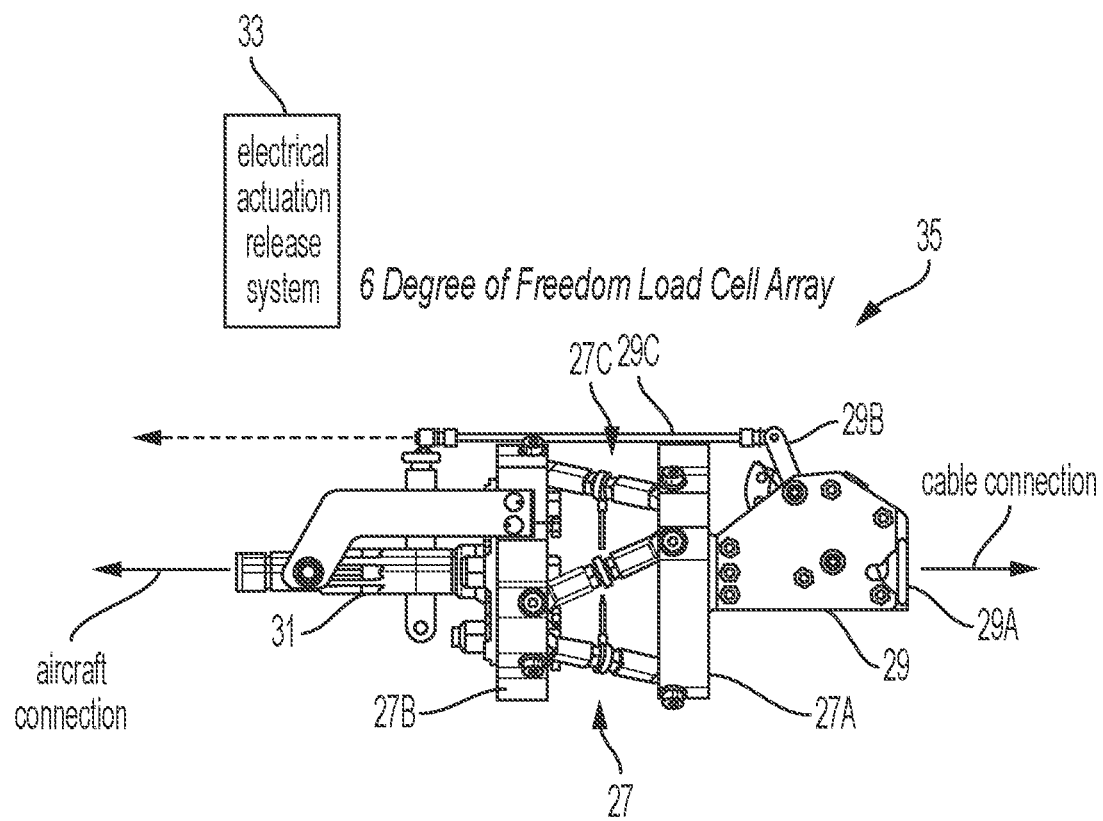
FIG. 10 depicts a cable connection assembly, according to an exemplary embodiment.
Figure 12:
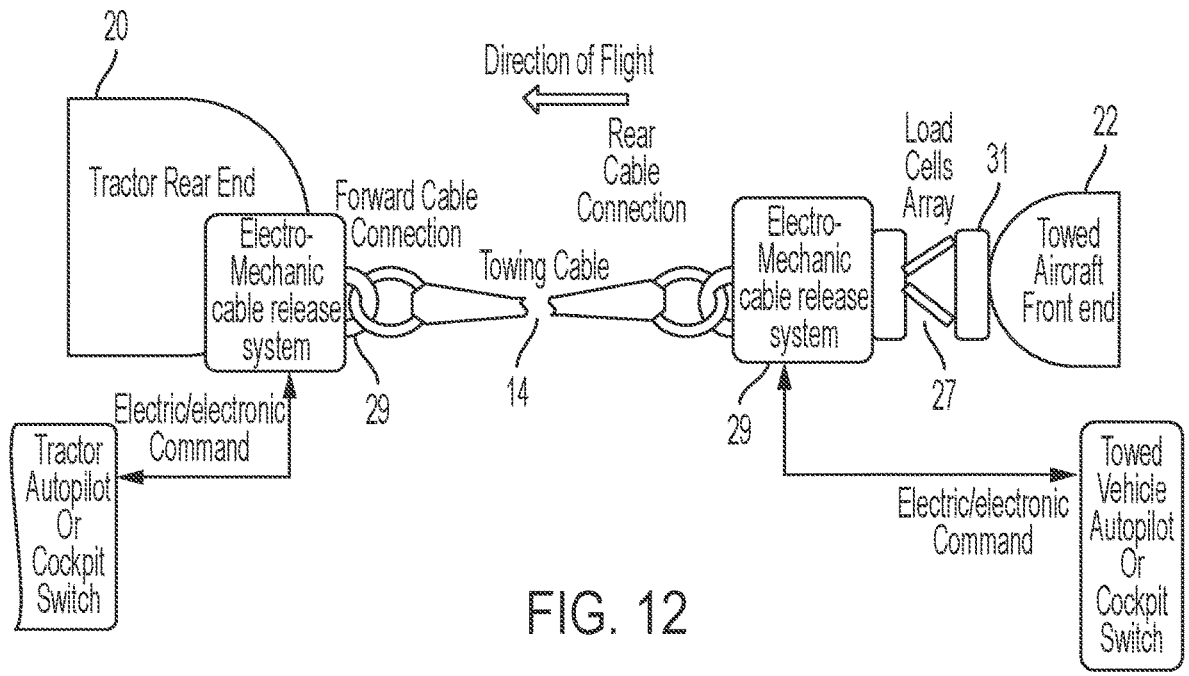
FIG. 12 is a schematic depiction of a cable connection assembly including an electrical actuation release mechanism, according to an alternate embodiment.
Figure 13:
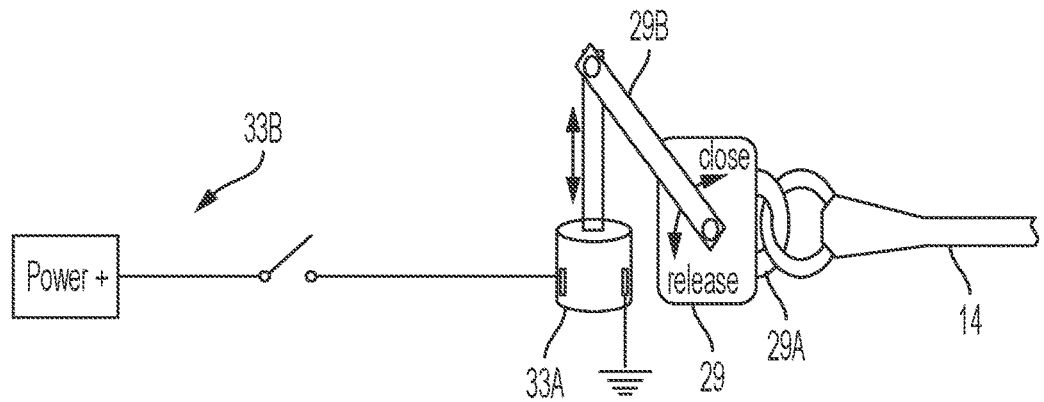
FIG. 13 is a detailed schematic depiction of the cable connection assembly including the electrical actuation release mechanism.

In certain embodiments as depicted in FIGS. 10, 12, and 13, a cable connection assembly 35 which may be a component of connection element 13 or 15, may comprise a cable connector 29 and an aircraft connector 31 coupled to cable connector opposite aircraft connector 31. Cable connector 29 is configured to couple to a front or aft end of cable 14, while aircraft connector 31 is configured to couple to the aircraft. In further embodiments, connection assembly 35 may also comprise a load cell array 27, which may be a component of the cable tension and direction sensor.

Load cell array 27 is mounted between the cable and aircraft and/or between aircraft connector 31 and cable connector 29. In certain embodiments, load cell array 27 may comprise a plurality of load cells 27C contained between front and first and second shelves 27A and 27B, respectively. In certain embodiments, load cell array 27 is configured to obtain vectorial information, including both magnitude and direction of the cable tension and to convey the information to the autopilot system. In one embodiment, load cell 27 may comprise 6 load cells 27C, but is not limited to this option.

In some embodiments, first shelf 27A and/or cable connector 29 may be coupled to cable 14, while second shelf 27B and/or aircraft connector 31 is coupled to a component such as the nose and/or front fuselage of towed aircraft 22 or to the tail and/or rear fuselage of tracto or towed aircraft 20 or 22.

In certain embodiments, cable connector 29 may comprise a hook 29A configured to engage cable 14. Hook 29A may be configured to release cable 14 via a hook release arm 29B which may be actuated via a pull force applied to a hook release line 29C coupled to arm 29B. In some embodiments, such pull force may be controlled via an electrically actuated release system 33, as will be described. In further embodiments, aircraft connector 31 may be coupled to second shelf 27B opposite load cell array 27 and may be attached to the towed aircraft opposite aft shelf. In some embodiments, aircraft connector 31 may be in communication with orientation and communication unit 12, pilot interaction panel 11 and/or autopilot system 24.

Towed Aircraft Electrical Release System

Figure 11:
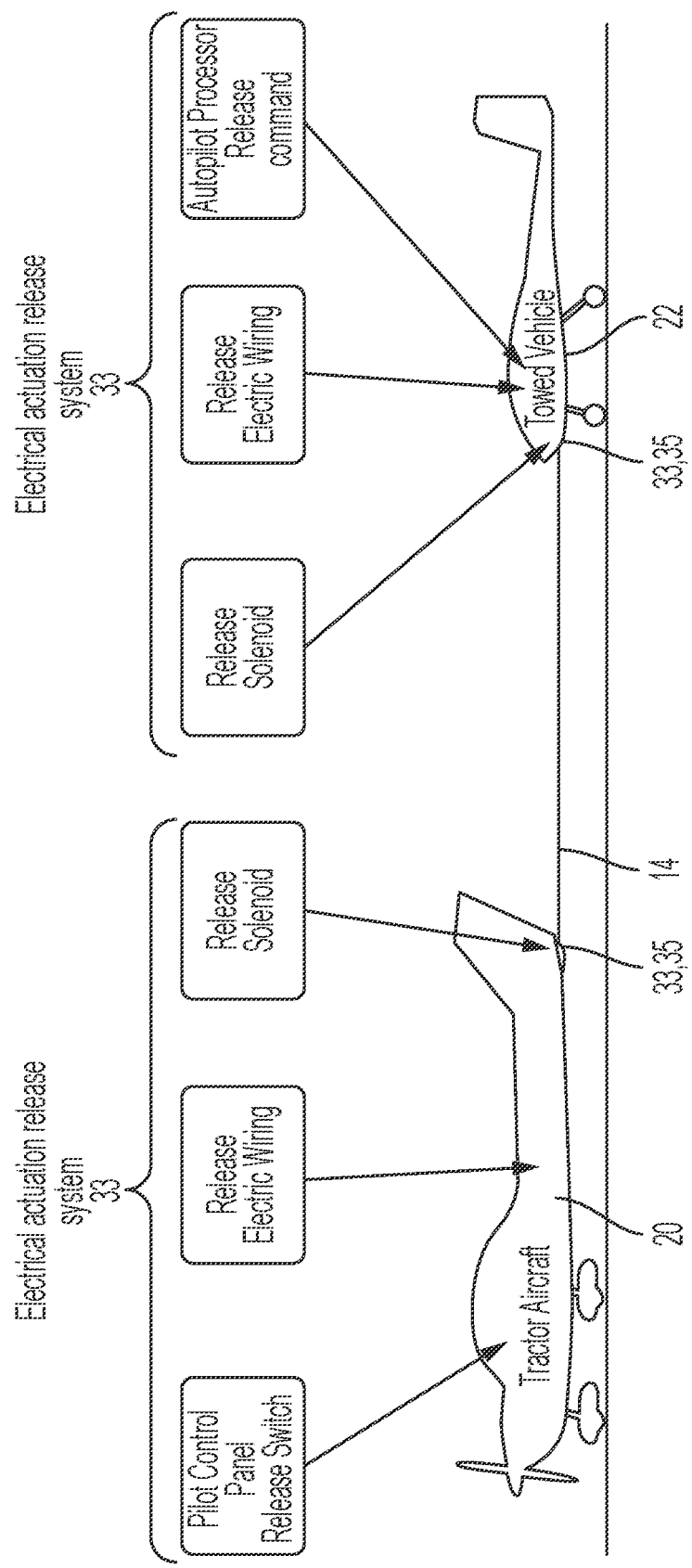
FIG. 11 is a schematic depiction of an electrical actuation release system for the towed aircraft system.

In certain embodiments as best depicted in FIGS. 11-13, a release mechanism to enable towed aircraft 22 to disconnect from towed aircraft chain 10 may comprise an electrical actuation release system 33 in connection element 13, 15/cable connection assembly 35. In certain embodiments, electrical actuation release system 33 is configured to release cable 14 from cable connector 29/connector assembly 35 (see FIG. 10) via application of a pull force on hook release arm 29B to disengage cable 14 from hook 29A. In certain embodiments, said pull force may be actuated via an actuator system comprising one or more solenoids 33A that are mechanically linked to arm 29B and may be activated via a switch circuit 33B of actuation release system 33. In certain embodiments, actuation release system 33 may be independently provided for each cable connection assembly, wherein the aft and forward cable connections may be separately released. In some embodiments, switch circuit 33B may be controlled by the cockpit/pilot interaction panel 11 of the tractor aircraft and/or the autopilot system 24 of the towed aircraft via electrical wiring and/or a data communication network. In further embodiments, an activation switch (e.g., button, handle, switch, etc.), may be provided to enable the autopilot or pilot to quickly activate the release system. As such, release of the cable on the tractor side and/or on the towed aircraft side may be activated automatically for emergency or routine operation via remote command. It shall be appreciated that in other embodiments, the cable connection may also be configured to release upon manual actuation. As such, electrical actuation release system 33 provides an electromechanical cable release system, which may be implemented within the tractor 20 and towed aircraft 22, configured to enable the pilot or the autopilot systems to release the towed vehicle from the cable or the cable from the tractor aircraft. The system further enables an autonomous towed aircraft 22 to be released and/or control its own release activity via electrically controlled actuators that mechanically disconnect the towing cable 14. Electrical actuation release system 33 may be used to release towed aircraft 22 in emergency situations, for example when the tractor aircraft may need to perform emergency procedures and cannot continue towing for safety of the flight, as well as in normal operation.

Autopilot System

In certain embodiments, autopilot system 24, which may be used to control all towed aircrafts 22 of towed aircraft system 10 may employ control surfaces, tow element data, landing gear elements, flight sensors, and/or tractor airplane data to perform functions such as maintaining stable flight, takeoff, land and taxi the towed aircraft, etc. In some embodiments, autopilot system 24 may be configured to control the towed aircraft(s) 22 when in tow, as well as when detached from the tractor aircraft.

According to various embodiments, autopilot system 24 may effectuate flight control and maintain the required position behind tractor airplane 20. As autopilot system 24 can react significantly faster and more accurately than a human pilot, it provides a highly efficient and precise means of maintaining the towed aircraft in its required position throughout the duration of the flight. The high level of precision in position maintenance is a critical factor in maximizing energy gain from flight behind the tractor craft and saving fuel. In certain embodiments, a human pilot may monitor, provide certain input, and/or override the auto pilot control system.

In some embodiments, autopilot system 24 may optimize flight efficiency based on airspeed and/or tension in the cable of towing element 14. In one example, autopilot system 24 may control tractor aircraft 20 and/or towed aircraft(s) 22 with the goal of minimizing cable tension to achieve a lower energy load on the tractor aircraft 20.

In certain embodiments, achieving a lower energy load may comprise maneuvering tractor airplane and/or towed aircraft(s) 22 to gain positive energy wake, or to "surf" the wake. This may comprise positioning the tractor aircraft at an accurate location above the turbulence vortex of the tractor aircraft. In certain embodiments, sensors which may integrate with the autopilot system may be configured to detect an optimal positioning for positive wake gain, wherein autopilot system may maneuver towed aircraft(s) 22 with respect to tractor aircraft 20. In some embodiments, tractor aircraft 20 may be sized and shaped to surf the wake of the turbulence vortex of the towing aircraft. To this end, tractor aircraft 20 may include wings which are stretched and designed to contain and harvest the stream flow of turbulent air to gain lift or thrust, thus requiring less towing force. In addition, the towed airplane positioning may aim to reduce drag by flying the towed airplane in the drag holes produced by the tractor aircraft, thus requiring less towing force.

In embodiments, autopilot system 24 may generally use orientation sensors and pre-fed orientation data from the tractor aircraft 20 and other sensors to enable towed aircraft (s) 22 to perform various functions which may be based on transmitted instruction. More specifically, the autopilot system 24 may be provided with a defined target path or function, such as maintaining position behind a tractor airplane, taxiing, takeoff, climbing, cruising, descent, approach, landing, etc., and may include multiple types of sensors, various processing control computation routines, e.g., for calculating the commands needed for performance of the various functions, and a set of actuation elements that enable the required maneuvers.

In one example, the tractor aircraft 20 may taxi to a specific cargo or holding location, to the location of the towing airplane, between the towing airplane to the cargo area, etc., according to programmed paths and communication with traffic control via commands from autopilot system 24. The autopilot system 24 may further be configured to enable the towed aircraft(s) 22 to execute a takeoff run, takeoff rotation, climb-out, etc., according to the location of the runway and the tractor airplane.

In some embodiments, autopilot system 24 may control the towed aircraft(s) 22 for maintaining an optimal position behind the tractor, e.g., for gaining positive energy wake, and maneuvering with the tractor airplane along the flight path. In one embodiment, the autopilot system may optimize between stability and performance based on factors such as thrust from the pulling tractor (e.g., based on the pull vector of the towing element) to determine optimal positioning and control surfaces trim state.

In certain embodiments, autopilot system 24 may instruct the tractor aircraft 20 to prepare for landing or runway touchdown, which may include extending flight surfaces and landing gear of the towed aircraft. In some embodiments, autopilot system 24 may further be configured to control braking and steering for maintaining an appropriate position with respect to the runway and the tractor airplane during different landing phases. In one embodiment, the towed aircraft(s) 22 may include extendable/retractable landing gear 34 which may be controlled via commands from the autopilot system 24, wherein guards for these actions may include standard airmanship switches (e.g., weight on wheel switches), and may further include location awareness, a trigger signal from the pilot, and/or an automated signal from the tractor aircraft, according to various embodiments.

Figure 5:
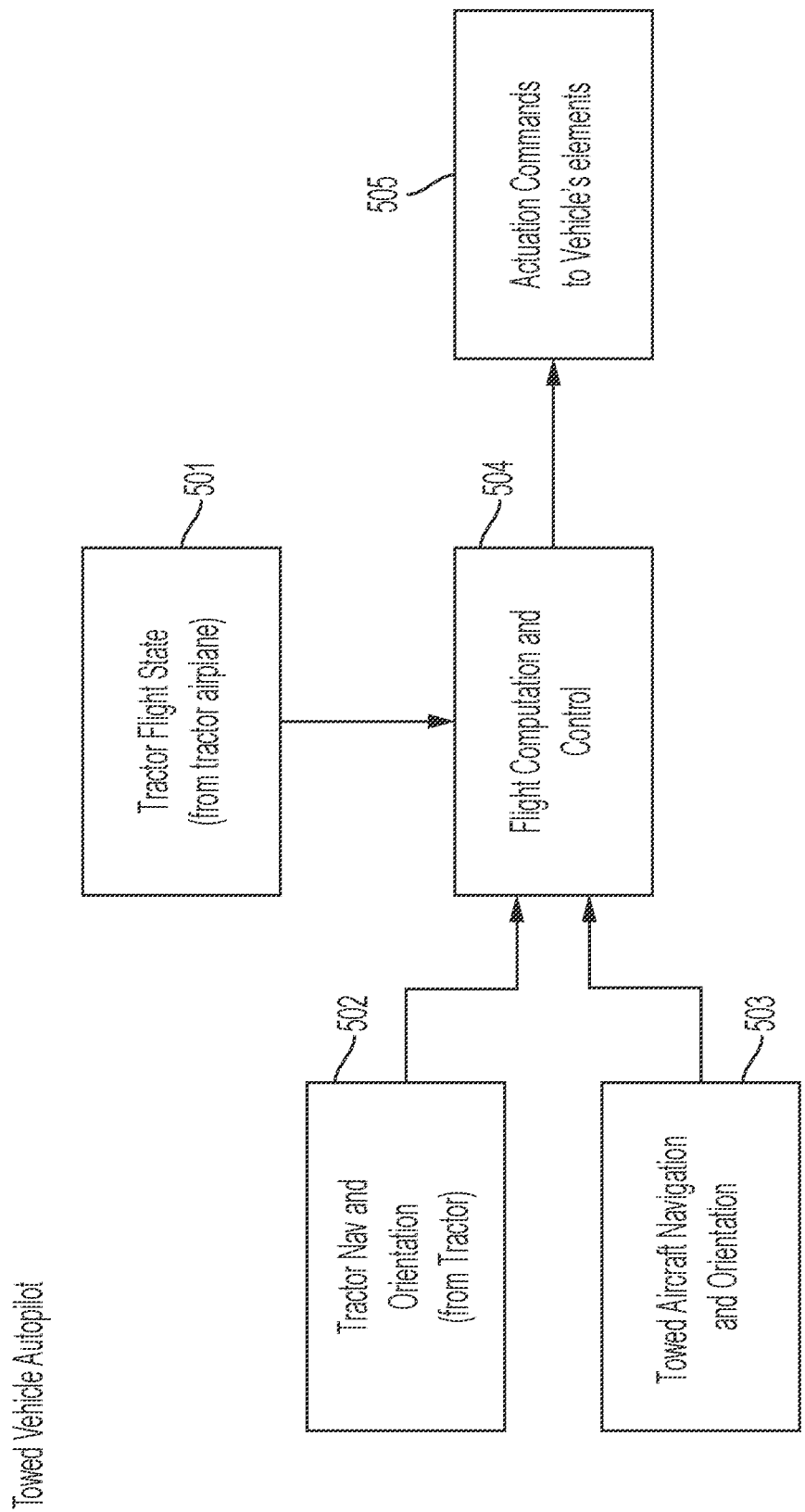
FIG. 5 is a flow diagram for an autopilot towed cargo system, according to certain embodiments.

In embodiments autopilot system 24 may comprise at least one processor for carrying out commands of an autopilot control algorithm 500, as depicted in FIG. 5. Autopilot control algorithm 500 may include a tractor Flight State module 501 configured to feed information regarding the state of the tractor aircraft; a tractor Navigation and Orientation module 502 configured to feed information regarding inertial moments, relative location, and other parameters derived from the towing activity; a towed Aircraft Navigation and Orientation module 503 which receives information from a collection of sensors of the towed aircraft, including flight sensors, towing related sensors and non-avionic related sensors; a flight computation and control module 504 which uses the inputs from modules 501, 502, and 503 to generate actuation commands; and an actuation control module 505 configured to command various actuation elements of the towed aircraft (i.e. flight control surfaces, landing gears, steering components, etc.) to implement actions determined by the flight computation and control module 504. In embodiments, autopilot control algorithm 500 may include various control laws or sub-modes that may be turned on and off according to the flight state, as follows:

Flight State: Parking, Active control Law: Brakes;
Flight State: Taxi, Active control Law: Brakes, Steering;
Flight State: Takeoff, Active control Law: Brakes, Steering, Stable Flight, Position for Takeoff;
Flight State: Climb, Active control Law: Stable Flight, Position for Climb;
Flight State: Cruise, Active control Law: Stable Flight, Position for Cruise;
Flight State: Descent, Active control Law: Stable Flight, Position for Descent;
Flight State: Land, Active control Law: Stable Flight, Position for Land, Brakes, Steering.

In embodiments, each one of the above-mentioned sub-modes may have a real-time target path, a reference of the current state, and the ability to activate actuation for closing the gap between them. As such, the towed aircraft may operate without human interaction as the autopilot reacts to the tractor airplane state to enable a seamless operation. It shall be appreciated that in alternate embodiments, the autopilot system may receive input from a human pilot of the tractor aircraft. It shall further be appreciated that in alternate embodiments, the autopilot system may function without pre-feed and/or orientation data from the tractor airplane.

In embodiments, autopilot system 24 may enable one or more towed aircraft to travel in tow and land while pulled by the tractor aircraft, wherein the system may be used control a chain of towed aircrafts. In some embodiments, the autopilot system may enable the towed aircraft(s) to detach from the tractor aircraft and autonomously land, wherein each towed aircraft may be released in air for cargo distribution and land at its own separate destination. In some embodiments, the autopilot system may enable the towed cargo aircraft(s) to switch tractors in flight. In further embodiments, the autopilot system may enable the towed cargo aircraft to autonomously taxi to a designated location in an airport.

Inflight Energy Transfer System

Conventional airplanes are limited in the total weight they can carry which may limit their ability to carry enough fuel for long duration flights. Additionally, any extra fuel that is loaded on an airplane reduces the available cargo/passenger capacity based on the weight limit. The disclosed subject matter provides an inflight energy transfer system, which comprises transferring energy from the towed aircraft to the tractor plane, thus circumventing the weight limitations on the plane.

Figures 6A, 6B:
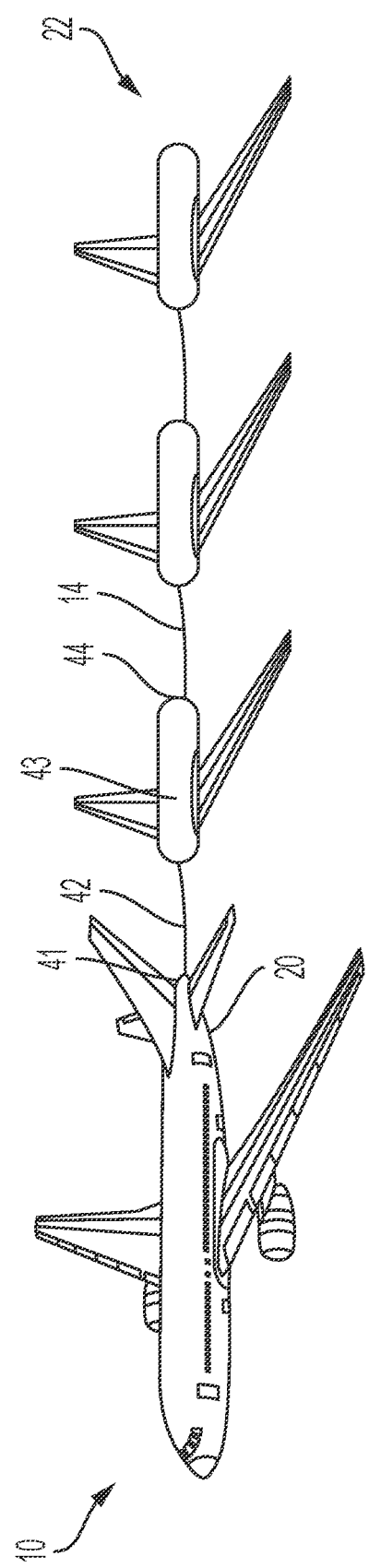
FIG. 6A depicts an inflight energy transfer system for the towed aircraft system, according to certain embodiments.
FIG. 6B is a schematic depiction of the inflight energy transfer system.

As depicted in FIGS. 6A and 6B an inflight energy transfer system 600 may comprise providing at least one towed aircraft that holds an energy storage element(s) which may be used to fuel the tractor airplane. Such energy storage elements may comprise fuel, hydrogen, electricity and/or a battery or other storage system, etc. In some embodiments, the energy transfer system may further comprise harnessing energy during flight via an energy harnessing system, wherein the harnessed energy may be stored within the energy storage element and/or used during flight. It shall be appreciated that energy carried by the towed aircraft(s) may also be used for powering needs of the towed aircraft itself. Additionally, the towed aircraft may carry various other cargo and/or supplies in addition to the fuel.

In embodiments as best depicted in FIG. 6B, components of inflight energy transfer system 600 may include an energy reception point 41, an energy transfer element 42, and an energy storage and/or generation unit 43. In further embodiments, the system may include a rear energy chain port 44 for a chain comprising multiple towed aircraft.

In certain embodiments, the energy storage element (which may store fuel, electricity, hydrogen, etc.) may be stored in energy storage/generation unit 43 of the towed aircraft and may flow towards a propulsion system of the tractor aircraft through the energy transfer element 42. In embodiments, the energy transfer element 42 may be for example, a tube for fuel transference and/or a cable for electricity transfer, or other component suitable for the specific type of energy being transferred. In embodiments, energy transfer element 42 may be integrated with and/or supported by the towing element 14 (i.e., cable), or may be a physically separate component.

In some embodiments, energy may be received through the rear of the tractor aircraft at energy reception point 41 and distributed to the various locations for use and/or storage, i.e., fuel tanks, batteries, and/or directly to the engines, etc.

In certain embodiments, rear energy chain port 44 enables operation of an energy chain of towed aircraft 22, wherein a leading tow aircraft may receive energy from trailing aircraft(s) through rear energy chain port 44. That energy may then be stored and/or forward to another aircraft (e.g., to the tractor aircraft for use). In embodiments, the disclosed system may be configured to transfer energy for storage or consumption as needed, based on commands from an energy distribution system, the autopilot system, and/or instruction from the pilot.

In certain embodiments, tractor aircraft 20 may be configured to power or transfer energy to the towed aircraft(s) 22 if needed. Additionally, the disclosed system may comprise a power generator system such as a 'ram air turbine' generator, which may be provided on the tractor or towed aircraft for generating energy in flight.

The disclosed system enables the tractor airplane to fly longer without being limited by the maximum takeoff weight or fuel storage capacity of the aircraft. As the towed aircraft(s) 22 generate their own lift, a minimal amount of thrust power from the tractor plane may be sufficient to tow the system providing economic benefit and efficiency over conventional systems. The disclosed system further enables alternate forms of fuel such as hydrogen to be more readily used, as it reduces safety concerns (in addition to storage issues) by enabling the fuel to be stored at a distance from the main aircraft. Similarly, it enables a large battery to be towed instead of placed in proximity to passengers in the main airplane, where safety and space may be a concern.

The disclosed system may be used to carry passengers, suitcases, and other cargo including freight merchandise, HAZMAT cargo, water, and other firefighting items and/or emergency supplies for piloted or unmanned aerial aircraft. In certain embodiments, the disclosed system may be used to carry a power supply element (which may be in addition to other cargo) for powering the tractor aircraft in flight. This may include fuel, battery for electric airplanes, hydrogen propulsion elements for hydrogen propelled airplanes, etc. Towing an aircraft with fuel can enable the tractor airplane to travel for longer distances and avoid flying routes that require stopping at refueling airfields. Additionally, the disclosed system may enable aircraft such as fighter jets, which may have excess thrust but limited flight time to extend their flight time by enabling inflight powering.

According to certain embodiments, the above-described system may be implemented by connecting one or more cargo carrying towed aircraft(s) 22 to a primary engine-powered tractor aircraft 20 and flying to one or more destinations to offload the cargo. In embodiments, cargo may be loaded to a towed aircraft before or after connecting it to another towed aircraft or to the tractor airplane. Once ready the system may be operated by a pilot and/or the autopilot system for towing one or more chain of aircraft behind the tractor aircraft. After takeoff, the towed aircraft may retract their landing gear and maintain an optimal position behind the tractor airplane (and one another) for safety and optimal energy usage. In some embodiments, the pilot may receive advisory inputs for maintaining optimal speed and positioning for safety and economics of the towed flight.

Before landing, the towed aircraft(s) may extend their landing gears and apply their own brakes and steering to maintain an appropriate position behind the tractor and/or leading aircraft at the landing phase and then taxi back to a designated location (i.e., a parking spot) after landing.

In certain embodiments, the connected chain may land together with the tractor aircraft at a single destination. In other embodiments, one or more of the towed aircraft may be individually released from the chained unit (e.g., by command from the pilot or autopilot system), and left to land by itself in a specific destination. Releasing one or few of the towed cargo aircrafts to land at specific destination eliminates the need for the tractor to descend and land at each destination where cargo needs to be shipped which may save time, fuel and operational cycles of the tractor airplane which is a major drive for cost, maintenance inspection and the life of an airplane.

When taxiing to the runway, the towed aircrafts may steer themselves and brake as needed to maintain the taxi path behind the tractor (or an independent taxi path if separated from the tractor), while remaining within the runway and at a safe distance from one another or other aircrafts. Cargo may be downloaded from the towed aircraft whether or not connected to the tractor or other aircraft.

The disclosed subject matter provides a cost effective and efficient cargo transport system which enables extra suitcases or payload for passenger flights, and quicker and less expensive product delivery, making these services more attractive to consumers. The disclosed system further eliminates the need to make fueling stops and provides cargo carrying aircraft system which reduces unnecessary elements, such as the pilot, windows, and other human supporting equipment, to free up space for additional cargo. Furthermore, the disclosed system reduces fuel consumption and carbon emissions.

Takeoff System for Towed Aircraft

In certain embodiments as best depicted in FIG. 7, a takeoff system 700 for towed air aircraft(s) 22 may comprise powering the landing gear wheels 34 of towed aircraft(s) 22 to accelerate the aircraft(s) along with the tractor aircraft 20 during takeoff. This enables towed aircraft(s) 22 to lessen the power demand on the tractor aircraft, enabling faster acceleration of the towed chain and a shorter takeoff distance.

In embodiments, the towed chain may comprise one or more towed air aircraft(s) 22, which are towed via a primary tractor aircraft 20 and connected via successive towing element(s) 14. In certain embodiments, each of the towed aircraft(s) 22 may carry cargo, an energy element (fuel, electricity, hydrogen, etc.), and/or passengers. The wheels of each of the towed Aircraft(s) may operate via an engine or motor configured to spin the aircraft's wheels during takeoff, as well as taxing. The engine/motor of each aircraft 20 may use various power sources, such as fuel, electricity, etc. Control of the landing gear wheels of the towed aircraft may be autopilot controlled and may be synchronized with the tractor plane via a computerized communication system.

The disclosed takeoff system enables a towed chain to achieve an appropriate airspeed over a shorter distance. As such, the disclosed system benefits from the increased efficiency of aircraft towing with less runway and/or weight limitations, enabling greater runway/takeoff location options, larger tractor aircraft and/or towed aircraft(s), and/or a larger number of towed aircrafts for a towed flight.

In Flight Switch System for Towed Aircraft

Figure 8B:
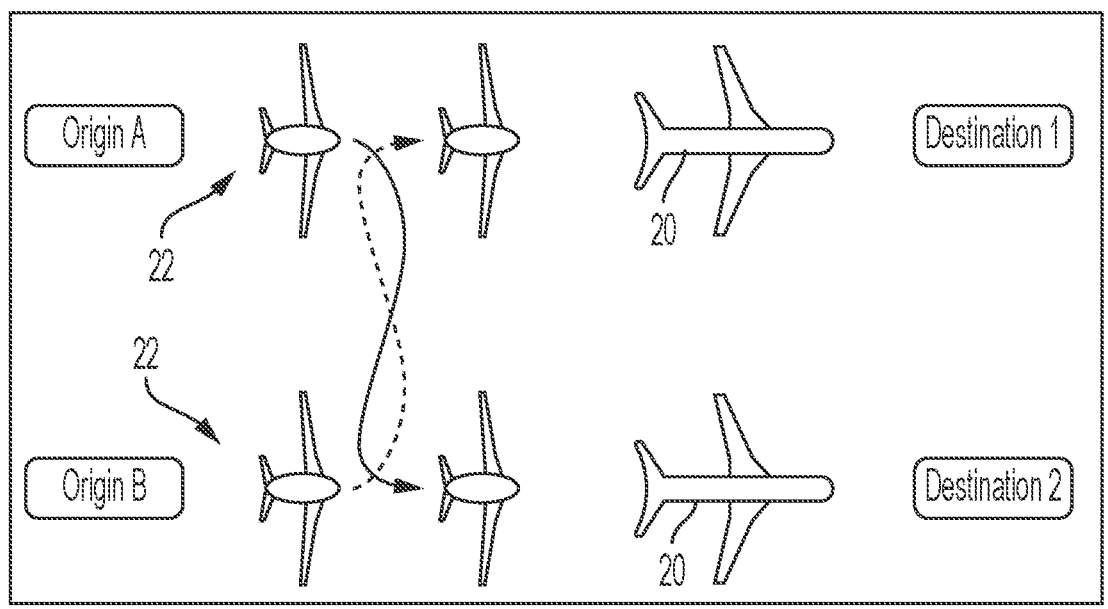
FIG. 8B is a schematic depiction of the inflight switch system.

In some embodiments as best depicted in FIGS. 8A and 8B, an in-flight switch system 800 for towed aircraft may comprise disconnecting a towed aircraft from its chain. In some embodiments, the disconnected aircraft 22 may then be connected to another towed chain in flight. In other embodiments, the disconnected aircraft 22 may land autonomously. This permits sorting of towed aircraft in flight instead of requiring the towed chain to land to switch the towed aircraft(s).

The towed chain may comprise one or more towed air aircraft(s) 22, coupled to a leading tractor aircraft 20 via tow element(s) 14 which connect successive aircrafts in the chain and are configured to enable connection and disconnection of the towed aircraft in flight. In certain embodiments, each of the towed aircraft(s) 22 may carry cargo, an energy element (fuel, electricity, hydrogen, etc.), and/or passengers.

In embodiments, switching the towed aircraft(s) during flight, including connecting and disconnecting from the tow element may be autopilot controlled, and the flight paths of multiple towed chains may be synchronized with one another to perform in flight switch over of the towed aircraft(s). Enabling tractor aircraft 20 to switch to a different tractor in flight permits the towed aircraft to take the most efficient route to its destination and may provide a more efficient in-flight fueling system. This process will further reduce the number of takeoffs, climbing, and cruising between unnecessary destinations to save time and energy usage.

Example

1) A first tractor aircraft flies from Dallas, Texas, USA to Frankfurt, Germany with a first towed cargo aircraft destined for Amsterdam.
2) A second tractor aircraft flies from Seattle, Washington, USA to London, England, with a second towed cargo aircraft destined for Frankfurt and a third towed cargo aircraft destined for Amsterdam.
3) A third tractor aircraft flies from Los Angeles, California, USA to Amsterdam.
4) First and second tractor aircraft may synchronize their flight paths with the third tractor aircraft, so that the first and third towed cargo aircraft may connect to the third tractor aircraft in flight. The First and second tractor aircraft may synchronize their flight paths so that the second towed cargo aircraft may switch its connection to the first tractor aircraft.

The disclosed system provides a more efficient and improved aircraft cargo system, which supports electrification of the aircraft propulsion with an overall increase in cargo to carbon emission ratio.

Persons of ordinary skill in the art may appreciate that numerous design configurations may be possible to enjoy the functional benefits of the inventive systems. It shall be appreciated that in alternate embodiments, components of the disclosed system may be eliminated and/or replaced with equivalent components as is known in the art. For example, the disclosed system may operate without the pilot panel, data information transfer systems, and/or retractable landing gears. In some embodiments, the tractor craft may operate autonomously and/or without an onboard human pilot. As such, the entire system, including tractor aircraft may be autopiloted in alternate embodiments. Thus, given the wide variety of configurations and arrangements of embodiments of the present invention, the scope of the invention is reflected by the breadth of the claims below rather than narrowed by the embodiments described above.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements.

I claim:

1. A cargo transport system comprising:
   an engine powered tractor aircraft;
   at least one unmanned autonomous towed aircraft, which is connected to the tractor aircraft for inflight towing by the tractor aircraft, wherein the towed aircraft includes a body with wings positioned on opposing sides of the body;
   a sensor system configured to sense flight parameters including relative positions of the tractor aircraft and the towed aircraft;
   at least one towing element comprising a cable coupled between the towed aircraft and the tractor aircraft; and
   an auto pilot system in the towed aircraft configured to receive the sensed flight parameters from the sensor system, wherein the autopilot system is configured to autonomously control taxiing, takeoff, flight, and landing of the towed aircraft, and wherein the autopilot system is configured to maintain, based at least in part on the sensed flight parameters, positions of the towed aircraft and the wings with respect to the tractor aircraft at specified positions for positive energy wake gain above a turbulence vortex produced by the tractor aircraft during flight, and wherein the position of the towed aircraft with respect to the tractor aircraft is controlled, at least in part, by adjustment of a length of the cable coupled between the towed aircraft and the tractor aircraft.

2. The cargo transport system of claim 1, wherein the length of the cable is adjustable based on one or more of the following parameters: flight state, environmental conditions, tractor aircraft weight, towed aircraft(s) weight, and cable tension.

3. The cargo transport system of claim 1, wherein the length of the cable is shortened for taxiing, lengthened for landing, and varied inflight to improve flight performance.

4. The cargo transport system of claim 1, wherein the autopilot system is configured to control a speed of the tractor aircraft to improve flight performance.

5. The cargo transport system of claim 1, wherein the towed aircraft is configured to power the tractor aircraft in flight.

6. The cargo transport system of claim 1, further comprising an additional towed aircraft, and wherein the additional towed aircraft is coupled to the first towed aircraft or to the tractor aircraft.

7. The cargo transport system of claim 1, wherein the wings are sized and shaped to gain lift and thrust from the turbulence vortex of the tractor aircraft.

8. The cargo transport system of claim 1, wherein the towing element includes a cable sensor configured to measure magnitude and/or direction of tension in the in the cable.

9. The cargo transport system of claim 8, wherein the autopilot system is configured to maintain the position of the towed aircraft based on, at least in part, the magnitude and/or direction of tension in the in the cable.

10. The cargo transport system of claim 1, wherein the autopilot system is further configured to control steering, and inflight maneuvering of the towed aircraft.

11. The cargo transport system of claim 10, wherein inflight maneuvering via autopilot control of the towed aircraft is based on inflight parameters of the tractor aircraft and/or the towed aircraft.

12. The cargo transport system of claim 1, wherein the towed aircraft carries cargo, an energy storage element, and/or emergency supplies.

13. The cargo transport system of claim 12, wherein the towed aircraft carries an energy storage element which comprises fuel, hydrogen, and/or a battery.

14. The cargo transport system of claim 1, wherein the towed aircraft is configured to disconnect from the tractor aircraft inflight.

15. The cargo transport system of claim 14, wherein the towed aircraft is further configured to land autonomously separated from the tractor aircraft.

16. The cargo transport system of claim 1, further comprising one or more ram air turbine(s) within the towed aircraft for generating electric power for inflight use.

17. The cargo transport system of claim 16, wherein the towing element enables energy flow as liquid fuel and/or electricity from the towed aircraft to the tractor aircraft.

18. The cargo transport system of claim 1, wherein the tractor aircraft is a single tractor aircraft configured to tow the towed aircraft without assistance from another aircraft.

19. The cargo transport system of claim 18, wherein the tractor aircraft is configured to tow the towed aircraft during taxiing, takeoff, and flight without assistance from another aircraft.

20. A cargo transport system comprising:
   an engine powered tractor aircraft;
   at least one unmanned autonomous towed aircraft, which is connected to the tractor aircraft for inflight towing by the tractor aircraft, wherein the towed aircraft includes a body with wings positioned on opposing sides of the body;

at least one towing element comprising a cable coupled between the towed aircraft and the tractor aircraft; and an autopilot system in the towed aircraft, wherein the autopilot system is configured to autonomously control taxiing, takeoff, flight, and landing of the towed aircraft, wherein the autopilot system includes:

one or more optical sensors positioned to detect a position and an orientation of the tractor aircraft;

a computer processor coupled to the optical sensors; and a memory coupled to the computer processor, the memory storing instructions executable by the computer processor to:

implement at least one computer vision algorithm to track a position and an orientation of the towed aircraft relative to the tractor aircraft based on the position and the orientation of the tractor aircraft detected by the optical sensors; and maintain, based at least in part on the position and orientation tracked by the at least one computer vision algorithm, a position of the towed aircraft with respect to the tractor aircraft at a specified position for positive energy wake gain above a turbulence vortex produced by the tractor aircraft during flight, wherein the position of the towed aircraft with respect to the tractor aircraft is controlled, at least in part, by adjustment of a length of the cable coupled between the towed aircraft and the tractor aircraft.

\* \* \* \* \*